219-121 SR

3/25/86 OR 4,578,557

United States Patent [19]

Turner

[11] Patent Number: 4,578,557

[45] Date of Patent: Mar. 25, 1986

[54] LIQUID STABILIZED PLASMA BURNER HAVING FLEXIBLE CATHODE HOLDER

[75] Inventor: Trueman D. Turner, Rockwood, Mich.

[73] Assignee: Plasmafusion, Inc., Wyandotte, Mich.

[21] Appl. No.: 688,957

[22] Filed: Jan. 4, 1985

[51] Int. Cl.[4] .......... B23K 9/00

[52] U.S. Cl. .......... 219/121 PP; 219/121 PR; 219/121 PM

[58] Field of Search ...... 219/121 P, 121 PM, 121 PP, 219/121 PR, 76.16, 75, 74, 121 PQ; 313/231.31, 231.41, 231.51

[56] References Cited

U.S. PATENT DOCUMENTS

| | | | |
|---|---|---|---|
| 3,073,984 | 1/1963 | Eschenbach et al. | 219/121 PR |
| 3,811,029 | 5/1974 | Averyanov et al. | 219/121 PR |
| 4,338,509 | 7/1982 | Bartuska et al. | 219/121 PP |

*Primary Examiner*—M. H. Paschall
*Attorney, Agent, or Firm*—Jeffers, Irish & Hoffman

[57] ABSTRACT

A cathode support for use in a liquid plasma stabilized plasma burner to support and guide the cathode element comprising a generally circular plate containing a generally circular shaped aperture therein. A multi-segment flexible cylinder defines a central bore. The cylinder is flexibly mounted to the plate so that the bore is generally coaxially aligned with the aperture in the plate. The cylinder is axially spaced apart from the plate.

20 Claims, 5 Drawing Figures

LIQUID STABILIZED PLASMA BURNER HAVING FLEXIBLE CATHODE HOLDER

BACKGROUND OF THE INVENTION

The invention relates to a liquid stabilized plasma burner, and in particular, to a liquid stabilized plasma burner having an improved flexible cathode holder.

During the operation of a liquid stabilized plasma burner, an electric arc exists between the cathode and anode. In order for the liquid stabilized plasma burner to operate successfully, this arc must be continuous. A more detailed description of the general operation of a liquid stabilized plasma burner is found in U.S. Pat. No. 4,338,509 issued July 6, 1982 for a "Process Of And Apparatus For Producing A Homogeneous Radially Confined Plasma Stream". The cathode holder illustrated in U.S. Pat. No. 4,338,509 is typical of the earlier cathode holder.

The earlier cathode holder is of a two-piece construction. One piece is an elongate cylinder of electrically-conductive material having an integral radially extending flange at one end thereof. An arcuate portion of the cylinder between the flange and the other end is removed to form an aperture. A corresponding electrically non-conductive portion or insert covers the aperture. A pair of elastic retainers surround the cylinder and insert to maintain the insert in place. The non-conductive insert occupies approximately 180 degrees of the circumference of the central bore of the cylinder.

As can be appreciated, one primary purpose of a liquid stabilized plasma burner is to coat objects with a coating material. The liquid stabilized plasma burner is maintained stationary and the object to be coated is moved relative to the plasma burner. The object to be coated may be rotating while it is moved in a generally longitudinally axial direction until its entire surface is coated. At this point, the plasma burner is turned off so that another object can be placed in the holder or jig.

When the plasma burner is turned off, there often times is created a severe vibration. Since the rod cathode is elongate and has a meaningful length thereof extending from the cathode holder, this vibration causes the rod cathode to move in a radial direction. The cathode holder that has been utilized heretofore has not always been able to accommodate this movement of the rod cathode so that electrical contact between the rod cathode and cathode holder is broken; and consequently, the electric arc between the cathode and the anode is terminated. As can be appreciated, this is an undesirable consequence.

The severe vibration that accompanies turning off the plasma burner can also cause the rod cathode to break since cathode holders of the past have not accommodated the movement of the rod cathode. If the cathode breaks, the electric arc will be terminated. As mentioned above, the termination of the electric arc is an undesirable consequence.

In order to restart the plasma burner, a portion of the plasma burner must be disassembled and the rod cathode repositioned relative to the cathode holder so that electrical contact exists therebetween. The plasma burner must then be assembled and restarted.

It would thus be desirable to provide a liquid stabilized plasma burner having an improved cathode holder that would maintain electrical contact with the cathode under vibratory conditions.

It would also be desirable to provide a liquid stabilized plasma burner having an improved cathode holder that would maintain electrical contact with the cathode under vibratory conditions in which the cathode moves in any generally radial direction.

It would also be desirable to provide a liquid stabilized plasma burner having an improved cathode holder that would accommodate the movement of the rod cathode during vibratory conditions so as to help prevent breakage of the rod cathode during the vibratory conditions.

SUMMARY OF THE INVENTION

It is an object of the invention to provide a liquid stabilized plasma burner having an improved cathode holder which maintains electrical contact with the cathode under vibratory conditions.

It is a further object of the invention to provide a liquid stabilized plasma burner having an improved cathode holder which maintains electrical contact with the cathode under vibratory conditions in which the cathode moves in any generally radial direction.

It is another object of the invention to provide a liquid stabilized plasma burner having an improved cathode holder which accommodates movement of the rod cathode during vibratory conditions so as to help prevent breakage of the rod cathode during the vibratory conditions.

In one form thereof, the invention is a cathode holder for facilitating the flexible guidance and support of the cathode element of a liquid plasma stabilized plasma burner comprising an electrically conductive plate containing a centrally disposed aperture. The aperture is adapted to permit passage of the cathode therethrough. A plurality of electrically conductive segments are flexibly connected together to form a cylinder easily receivable and flexibly supportive of the cathode element. The cylinder includes a bore which is adapted to permit passage of the cathode therethrough. The holder further includes a mounting means for flexibly mounting the cylinder to the plate.

In another form thereof, the invention is a cathode support for use in a liquid plasma stabilized plasma burner to support and guide the cathode element comprising a generally circular plate containing a generally circular-shaped aperture therein. A multi-segment flexible cylinder defines a central bore and is flexibly mounted to the plate so that the bore is generally coaxially aligned with the aperture in the plate. The cylinder is axially spaced apart from the plate.

In another form thereof, the invention is a flexible cathode support positionable within a divider case for use in a liquid plasma stabilized plasma burner comprising a generally circular plate. The plate contains a central aperture and a plurality of equal-spaced peripheral mounting holes positioned radially outward of the central aperture. A cylinder has a plurality of flexibly connected segments. Each of the segments has a radially extending flange at each end. A reduced diameter portion is defined between the flanges. The reduced diameter portions of the segments define with the divider case a coolant channel.

In another form thereof, the invention is a liquid plasma stabilized plasma burner comprising a generally cylindrical housing having opposite front and rear ends. A divider case is contained within the housing mediate of the opposite ends and an arc chamber is positioned axially forward of the divider case. A rod cathode is fed into the housing at the rear end thereof and protrudes into the arc chamber. A nozzle is at the front end of the housing and communicates with the arc chamber. An anode is spaced axially forward of the nozzle.

The plasma burner further includes a flexible cathode support contained within the divider case. The cathode support includes a generally circular plate contain a central aperture through which the cathode passes. A multi-segment flexible cylinder defines a central bore adapted to flexibly hold a rod cathode. The cylinder is flexibly mounted to the plate so that the bore is generally coaxially aligned with the plate aperture. The cylinder is spaced axially forward of the plate.

DETAILED DESCRIPTION OF A SPECIFIC EMBODIMENT

Figure 1:
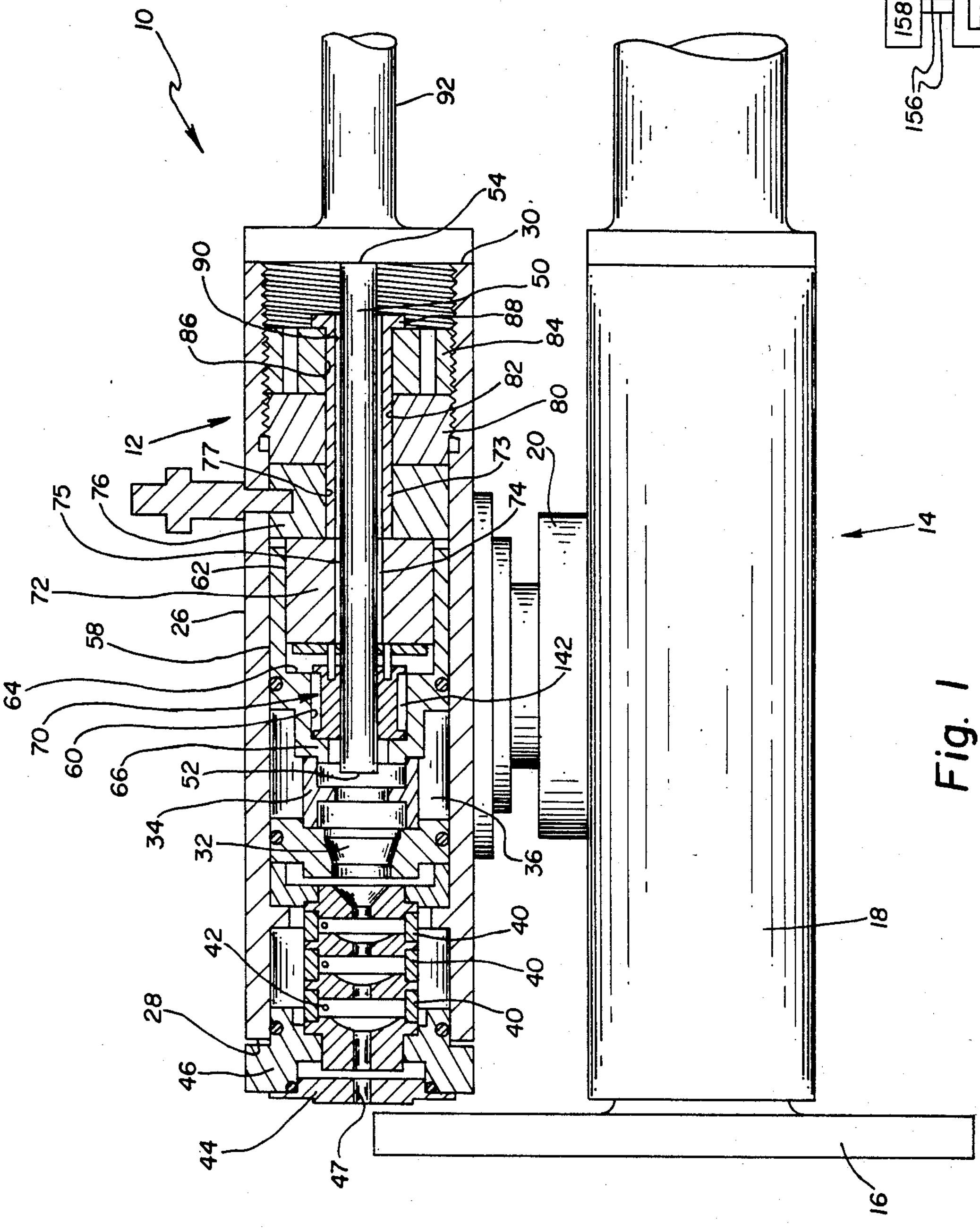
FIG. 1 is a side elevation view of a specific embodiment of the invention with the burner body shown in cross section.

Referring to FIG. 1, there is illustrated a liquid plasma stabilized plasma burner generally designated as 10. Plasma burner 10 includes an elongate cylindrical burner body generally designated as 12 and an anode assembly generally designated as 14. Anode assembly 14 includes a rotational anode 16 connected to an anode driving assembly 18. Anode driving assembly 18 is connected to burner body 12 by an anode adjustment assembly 20. Further details regarding the operation of the anode assembly are found in U.S. Pat. No. 4,338,509 mentioned above. U.S. Pat. No. 4,338,509 is incorporated by reference herein.

Burner body 12 includes a cylindrical shell 26 having a front end 28 and a rear end 30. An arc chamber 32 is found within cylindrical shell 26. One end of arc chamber 32 is defined by an internal shell 34. There exists an annular circulation space 36 defined between the outer edge of internal shell 34 and interior surface of cylinder shell 26. Cylindrical shell 26 includes ports for the introduction and exit of cooling liquid to cool the plasma burner. The cooling fluid circulates in circulation space 36.

A plurality of orifice plates 40 extend axially forward of arc chamber 32. A tangentially directed orifice 42 is contained within each one of orifice plate 40. The stabilizing liquid exits through the orifices 42. Cylindrical shell 26 includes a port through which the stabilizing liquid is introduced for subsequent exit by orifices 42.

A nozzle 44 is attached to a nozzle holder 46. Nozzle holder 46 is attached to the front end of 28 of cylindrical shell 26. Nozzle 44 includes a central aperture 47 through the plasma stream passes when the plasma burner is in operation.

Burner body 12 further includes an elongate rod cathode 50 having a front end 52 and a rear end 54. Rod cathode 50 is a carbon cathode that is typically made from graphite.

A divider case 58 is contained within cylindrical shell 26 mediate of front end 28 and rear end 30 thereof. Divider case 58 includes a bore having a reduced diameter portion 60 connected to an enlarged diameter portion 62 by an annular shoulder 64. The enlarged diameter portion 62 is located axially rearward of reduced diameter portion 60. An annular radially inwardly directed flange 66 is found at the axially forward portion of reduced diameter portion 60.

A cathode holder generally designated as 70 is contained within divider case 58. An electrically conductive holder stopper 72 having a central bore 73 is positioned axially rearward of cathode holder 70. A cylindrical insulator 74 is contained within bore 73. Insulator 74 further includes a bore 75. In view of the insulator, it can be appreciated that holder stopper 72 is not in electrical communication with the rod cathode. However, holder stopper 72 is in electrical contact with the cathode holder 70. Holder stopper 72 for the most part is contained within the enlarged diameter portion of the divider case. The forward surface of holder stopper 72 abuts against cathode holder 70.

A charge ring 76 is positioned axially rearward of holder stopper 72. Charge ring 76 abuts against holder stopper 72. Charge ring 76 includes an aperture 77. Charge ring 76 further contains a threaded aperture 78 therein. The threaded aperture 78 corresponds to an aperture 78' contained in the cylindrical shell so that these apertures (78 and 78') are in alignment. An elongate terminal bolt 79 passes through the aperture in the shell and is threaded into charge ring 76 at aperture 78. A cathode cable 91 has one end connected to the distal end of terminal bolt 79 protruding out from the cylindrical shell. The other end of the cathode cable 91 is connected to the negative terminal of an electrical power source. It can thus be appreciated that the source of electrical power is directly connected to charge ring 76.

An electrically non-conductive stopper nut 80 is positioned axially rearward of charge ring 76 and abuts thereagainst. Stopper nut 80 includes an aperture 82. A bronze nut 84 is positioned axially rearward of stopper nut 80 and abuts thereagainst. Bronze nut 84 includes an aperture 86.

An elongate carbon charge 88 has a central bore 90. Carbon charge 88 passes through aperture 86 found in bronze nut 84, aperture 82 found in stopper nut 80 and aperture 77 found in charge ring 76. Carbon charge 88 includes a flange which abuts against the rearwardly facing surface of bronze nut 84. A cathode feeding device 92 cooperates with cathode 50 so as to automatically feed it in an axially forward direction at an appropriate rate of feed.

As can be seen by viewing FIG. 1, cathode 50 extends through the bore 90 of carbon charge 88, and through cathode holder 70 so as to extend towards arc chamber 32. It should now be understood that the cathode holder is the only point of electrical contact along the length of the rod cathode. The electric current is received by the charge ring and travels through the holder stopper to the cathode holder where it travels to the rod cathode. As can be understood, the rod cathode is insulated from the charge ring 76 by carbon charge 88 and from holder stopper 72 by insulator 74. If the electrical connection between the cathode holder and rod cathode ceases, the electric arc struck between the tip of the cathode and the anode also terminates. It is thus important to maintain this electrical connection throughout the operation of the plasma burner.

Figure 2:
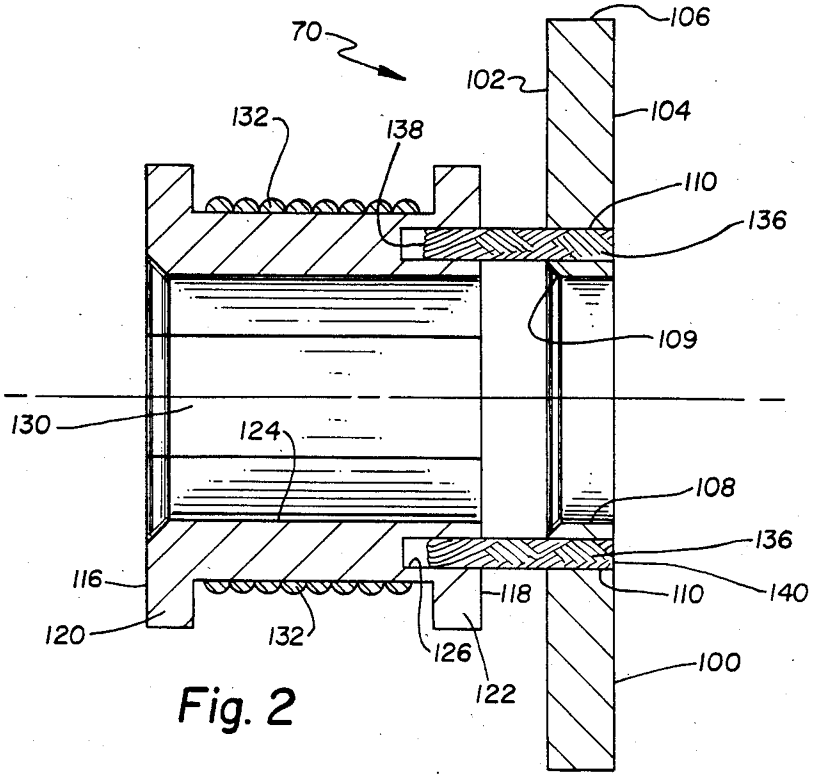
FIG. 2 is a cross sectional view of the flexible cathode holder illustrated in FIG. 1.
Figure 3:
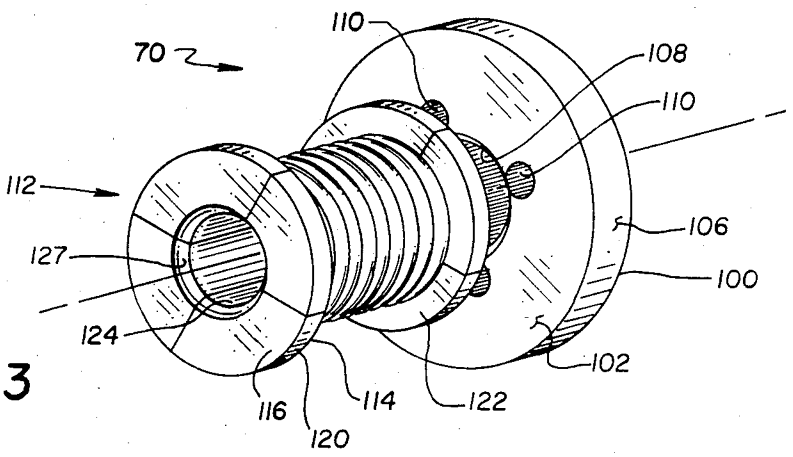
FIG. 3 is a perspective view of the flexible cathode holder illustrated in FIG. 1 without the flexible wires used to connect the circular plate and cylinder.
Figure 4:
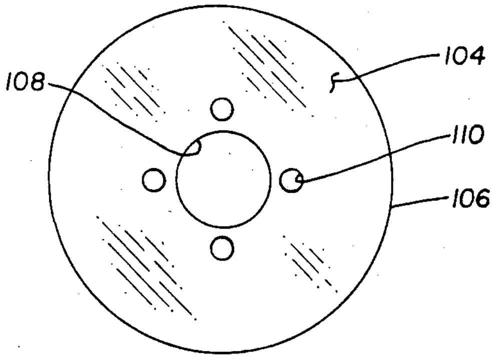
FIG. 4 is a rear plan view of the circular plate.

Referring to FIGS. 2 through 4, cathode holder 70 includes an axially rearwardly positioned cylindrical plate 100. Plate 100 includes a front surface 102 which faces forwardly and a rear surface 104 which faces rearwardly. Plate 100 further includes a circumferential edge 106 as well as a central aperture 108. A bevelled portion 109 surrounds central aperture 108. A plurality of fastening apertures 110 are generally circumferentially equi-spaced radially outwardly of central aperture 108.

Cathode holder 70 further includes a spool generally designated as 112. Spool 112 includes a plurality of segments 114. Each segment 114 is substantially identical so that the below description of one segment will suffice for the description of the remaining three segments.

Segment 114 includes a front end 116 and a rear end 118. There is found a front radially outwardly extending annular flange 120 at front end 116 of segment 114. There is found a rear radially outwardly extending annular flange 122 at the rear end 118 of segment 114. Segment 114 further includes an arcuate interior surface 124. Rear flange 122 includes an axially disposed rear flange aperture 126. Aperture 126 is spaced approximately midway between the opposite ends of flange 122. The forward edge of interior surface 124 is bevelled as at 127.

When one considers spool 112 as a whole, it can be appreciated that the combination of the four segments 114 define a central bore 130 passing through spool 112. A plurality of flexible elastic bands 132 surround all four segments 114 so as to flexibly connect them together to form spool 112.

A length of braided copper wire 136 connects each segment to cylindrical plate 100. Each length of braided wire 136 has one end 138 thereof contained within aperture 126 of its corresponding segment 114. The other end 140 of the length of braided wire 136 is connected, such as by soldering, it to its corresponding fastening aperture 110 found in cylindrical plate 100. This arrangement is true for each of the four segments 114. It can thus be appreciated that spool 112 is flexibly connected by the lengths braided wire 136 to circular plate 100.

Referring back to FIG. 1, it can be seen that there is a coolant circulation volume 142 defined between the external surface of the mediate portion of spool 112 and the interior surface of the reduced diameter portion 60 of divider case 58. It should be appreciated that bands 132 fall within this coolant circulation volume coolant circulation. Thus, bands 132 remain relatively cool throughout the operation of the plasma burner, and are less subject to deterioration due to heat. Consequently, their life expectancy is lengthened.

Figure 5:
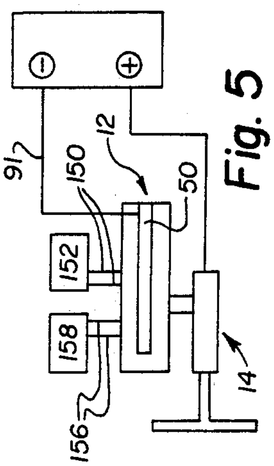
FIG. 5 is a mechanical schematic view of the plasma burner in which the cathode holder is used illustrating the basic electrical connections between the power source and the burner and the cooling liquid conduit arrangement.

FIG. 5 illustrates coolant conduits 150 for the entrance and exit of coolant to and from the coolant circulation volume 142. The coolant is supplied from a coolant source 152. Although not specifically illustrated, it should be appreciated that the shell as well as the divider case 58 will contain ports so as to permit the passage of coolant to and from the volume 142. FIG. 5 illustrates coolant conduits 156 for the entrance and exit of coolant to and from annular circulation space 36. The coolant is supplied from a coolant source 158. Although not specifically illustrated, it should be appreciated that the shell will contain ports to permit the passage of coolant to and from volume 36.

As previously described, when the plasma burner is turned off there occurs a vibration in the entire plasma burner which sometimes severly shakes the rod cathode. In the past, the inability of the cathode holder to accommodate this movement has resulted in a loss of electrical contact between the cathode holder and the rod cathode or the breakage of the rod cathode. Both of those occurrence lead to a termination of the electric arc, and hence, the coating operation being performed by the plasma burner. The present invention is designed to avoid the above problems.

In the present invention, it can be understood that the segments 114 are flexibly connected together. Each of the segments is constructed from an electrically conductive material. Thus, electrical contact between the cathode holder and the rod cathode is constantly maintained no matter what direction of radial movement the rod cathode takes since the segments will move along with the rod cathode.

It can also be understood that the spool 112 is flexibly connected to the circular plate 100. Plate 100 is made from an electrically conductive material. This flexibility enhances the ability of the cathode holder 70 to maintain electrical contact with the rod cathode since in addition to the segments being flexible, the entire spool 112 is flexible relative to the circular plate.

The flexibility of the cathode holder also enhances the ability of the cathode holder to hold the rod cathode during movement of the cathode so as to prevent against breaking the rod cathode.

It should also be mentioned that the flexibility of spool 112, both between its segments 114 and relative to the circular plate 100, facilitates the ease with which a new rod cathode can be fed through the central bore defined through spool 112. This easier feeding of the rod cathode helps reduce the length of downtime between rod cathode changes. Overall, it can be appreciated that the flexibility of the cathode holder provides meaningful advantages over the earlier cathode holder. These advantages result in increased operating efficiencies and performance of the plasma burner.

It should be mentioned that the cathode support is relatively easily manufactured. The spool is initially provided as a solid piece having four equi-spaced circumferential holes drilled in the one end thereof. The spool is then longitudinally sliced midway between each hole. The result is four arcuate segments each having a hole in one end thereof. A length of braided copper wire is then soldered at one end thereof in each hole. The segments are then assembled and connected together by rubber bands. The circular plate is provided with the larger diameter central aperture and the four equi-spaced circumferential peripheral apertures. The free end of each wire is fed through its correspond plate peripheral aperture. The spool is then held an appropriate distance away from the plate, and the wires are soldered to their respective apertures. The result is the cathode holder of the invention.

While there have been described above the principles of this invention in connection with a specific apparatus, it is to be clearly understood that this description is made only by way of example and not as a limitation to the scope of the invention.

What is claimed is:

1. A cathode holder for facilitating the flexible guidance and support of a cathode element of a liquid plasma stabilized plasma burner comprising:

an electrically conductive plate containing a centrally disposed aperture adapted to permit passage of the cathode therethrough;

a plurality of electrically conductive segments flexibly connected together to form a cylinder easily receivable and flexibly supportive of the cathode element, said cylinder including a bore adapted to permit passage of the cathode therethrough; and a mounting means for flexibly mounting said cylinder to said plate.

2. A cathode holder for facilitating the flexible guidance and support of a cathode element of a liquid plasma stabilized plasma burner comprising:

an electrically conductive plate containing a centrally disposed aperture adapted to permit passage of a cathode therethrough and containing a plurality of peripheral apertures;

a purality of electrically conductive segments flexibly connected together to form a cylinder easily receivable and flexibly supportive of the cathode element, said cylinder including a bore adapted to permit passage of the cathode therethrough, each one of said segments containing a segment aperture therein, one of said peripheral apertures corresponding to each of said segment apertures; and a mounting means for flexibly mounting said cylinder to said plate including a flexible wire mounted to and passing between each pair of corresponding apertures so as to flexibly mount each of said segments to said plate.

3. The cathode holder of claim 2 wherein said flexible wire is a braided copper wire.

4. The cathode holder of claim 1 further including an elastic band surrounding said segments so as to flexibly connect together said segments.

5. The cathode holder of claim 1 wherein said cylinder is spaced axially forward of said plate.

6. The cathode holder of claim 1 wherein said bore is generally coaxially aligned with said aperture.

7. The cathode holder of claim 1 wherein said cylinder includes four of said segments so that said cylinder and cathode maintain electrical contact through 360 degrees of movement of the cathode.

8. The cathode holder of claim 1 wherein said mounting means is electrically conductive.

9. A cathode support for use in a liquid plasma stabilized plasma burner to support and guide a cathode element, the support comprising:

a generally circular plate containing a generally circular-shaped aperture therein; and a multi-segment flexible cylinder defining a central bore, said cylinder flexibly mounted to said plate so that said bore is generally coaxially aligned with said aperture in said plate, and said cylinder being axially spaced apart from said plate.

10. A cathode support for use in a liquid plasma stabilized plasma burner to support and guide a cathode element, the support comprising:

a generally circular plate containing a generally circular-shaped aperture therein;

a multi-segment flexible cylinder defining a central bore, said cylinder flexibly mounted to said plate so that said bore is generally coaxially aligned with said aperture in said plate, and said cylinder being axially spaced apart from said plate; and a plurality of braided flexible wires extending between and secured to said cylinder and said plate so as to flexibly mount each of said segments to said plate.

11. A cathode support of claim 10 wherein each of said segments contains a segment aperture therein, said plate further contains a plurality of peripherally-disposed apertures, each of said segment apertures having a corresponding peripheral aperture, and one of said braided wires extending between and mounted to each corresponding pair of said peripheral and segment apertures.

12. The cathode support of claim 9 wherein an elastic band surrounds all of said segments so as to flexibly connect together said segments.

13. The cathode support of claim 9 wherein said plate is made of an electrically conductive material.

14. The cathode support of claim 9 or 13 wherein said flexible cylinder segments are made of an electrically conductive material.

15. The cathode support of claim 9 wherein said plate and said segments are made of an electrically conductive material, and further including banding means, surrounding said segments, for flexibly connecting said segments together so that said cylinder and the cathode element continually maintain electrical contact through 360 degrees of radial movement of the cathode element.

16. A flexible cathode support positionable within a divider case for use in a liquid plasma stabilized plasma burner, the cathode support comprising:

a generally circular plate containing a central aperture and a plurality of equi-spaced peripheral mounting holes positioned radially outward of said central aperture;

a cylinder having a plurality of flexibly connected segments, each of said segments having a radially extending flange at each end, a reduced diameter portion defined between said flanges; and said reduced diameter portions of said segments defining with the inside wall of said divider case a coolant channel.

17. The flexible cathode support of claim 16 wherein said plate and said cylinder are made from an electrically conductive material.

18. The flexible cathode support of claim 16 further including band means, surrounding said segments, for flexibly connecting said segments together, and said band means being positioned within said coolant channel.

19. The flexible cathode support of claim 16 wherein said coolant channel is in operative communication with a source of coolant.

20. A liquid plasma stabilized plasma burner comprising:

a generally cylindrical housing having opposite front and rear ends, a divider case contained within said housing mediate of said opposite ends;

an arc chamber positioned axially forward of said divider case;

a rod cathode fed into said housing at the rear end thereof and protruding into the arc chamber;

a nozzle at said front end of said housing and communicating with said arc chamber;

an anode spaced axially forward of said nozzle; and a flexible cathode support contained within said divider case, said cathode support including a generally circular plate containing a central aperture through which said cathode passes, and a multi-segment flexible cylinder defining a central bore adapted to flexibly hold the rod cathode, said cylinder being flexibly mounted to said plate so that said bore is generally coaxially aligned with said plate aperture, and said cylinder being spaced axially forward of said plate.

* * * * *